United States Patent Office 3,491,046
Patented Jan. 20, 1970

3,491,046
LEAD DIOXIDE/MANGANESE DIOXIDE/SULFUR CURE FOR POLYSULFIDE-BITUMINOUS COMPOSITIONS
John M. Pachuta, Trenton, N.J., assignor to Thiokol Chemical Corporation, Bristol, Pa., a corporation of Delaware
No Drawing. Filed Feb. 24, 1967, Ser. No. 618,316
Int. Cl. C08h 13/10
U.S. Cl. 260—28     5 Claims

ABSTRACT OF THE DISCLOSURE

Cured compositions containing polysulfide polymers and bituminous material are provided which are resilient and do not revert or soften on heating. This combination of properties in the cured compositions is achieved by the use of a lead dioxide/manganese dioxide/sulfur cure system.

BACKGROUND OF THE INVENTION

Compositions, such as cured sealant compositions, containing polysulfide polymers and bituminous materials are known (U.S. 2,910,922 and 3,238,165). Because of their good solvent resistance, such compositions are particularly useful in applications wherein the cured compositions are to come in contact with various solvent type materials such as gasoline and jet fuel. Such applications include, therefore, the sealing and coating of highways, parking lots, gasoline station aprons, air field surfaces and hanger decks. In order to be useful for such applications, the compositions must also be heat resistant in order to withstand the heat of the summer sun and/or the exhaust of jet engines, as well as resilient in order to be flexible enough to undergo expansion and contraction with changes in ambient temperature.

Curing agents which have been used to date for the curing of polysulfide polymer-bituminous material compositions include lead dioxide and manganese dioxide. The compositions cured with either or both of these curing agents, however, have a rather limited degree of utility since such cured compositions do not have the necessary combination of thermal stability and resilience properties which will allow for their widespread use in outdoor sealing or coating applications. Upon prolonged exposure to heat, such cured compositions revert or soften back and thereby lose the dimensional stability needed, for example, for joint sealing applications. The cured compositions may also be too hard or brittle for joint sealing or coating applications and therefore crack under stress of weight load or expansion and contraction of the sealed or coated structures upon exposure of such structures to changes in the ambient temperature.

SUMMARY OF THE INVENTION

It has now been found that cured compositions containing polysulfide polymers and bituminous materials such as coal tar can be prepared for joint sealing and coating applications and which will be resilient and not revert back or soften upon exposure to prolonged heating, if there is used as the curing system for such compositions, a combination of lead dioxide, manganese dioxide and elemental sulfur. The curable composition of the present invention contain, per 100 parts by weight of polysulfide polymer therein, about 50 to 300 parts by weight of bituminous material, about 0.5 to 10 parts by weight of elemental sulfur, about 4 to 20 parts by weight of lead dioxide, and about 0.5 to 5 parts by weight of manganese dioxide.

DESCRIPTION OF THE PREFERRED EMBODIMENT

The polysulfide polymers which may be used in the novel compositions of the present invention are organic polymeric materials which are liquid, i.e., pourable at room temperature, about 25° C., and which contain recurring polysulfide linkages, i.e. —$(S_n)$—, in the polymeric backbone, wherein $n$ is, on the average, about 1.5 to 5. The polymers contain a plurality of —SH or —SSH groups through which the liquid polymers may be oxidatively cured to form solid elastomers. Such polymers include those which have —SH terminals as are described in U.S. 2,466,963; polymers which have —SSH groups as are described in copending application Ser. No. 583,480 filed Sept. 30, 1966, now U.S. Patent No. 3,331,818 in the name of E. R. Bertozzi and polymers which have blocked —SSH groups as are described in copending application Ser. No. 302,724 filed Aug. 16, 1963 in the name of E. R. Bertozzi and now abandoned. The preferred of these polymers are those having a molecular weight of about 500 to 12,000. The most preferred of such polymers are those having a molecular weight of about 500 to 4,000, since such polymers allow for the most efficient cure times. Structurally, the polymers may be represented by the formula

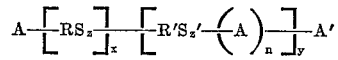

wherein A is SH or SSH;
A' is H or SH;
R and R' are polyvalent organic radicals such as are disclosed in Tables I and II of U.S. 2,789,958. R being divalent and R' having a valence of 2, 3 or 4;
$x$ is an integer from 2 to about 10;
$y$ is an integer from 0 to about 10;
$n$ is an integer from 0 to 2; and
the numerical average of all the $z$'s and $z''$s is about 1.5 to 5.

The polymers having SH terminals would have the structure

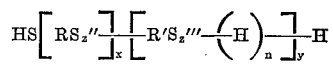

wherein the average numerical value of all the $z'''$s and $z''''$s is about 1.5 to 2
and R, R', $x$, $y$ and $n$ are all as defined above.

The polymers having SSH terminals would have the structure

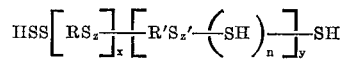

wherein R, R', $z$, $z'$, $x$, $y$ and $n$ are all as defined above.

Each of the various types of these polymers can be used either alone or in combination with one another in the novel compositions of the present invention.

The elemental sulfur which may be used according to the teachings of the present invention can be any of the commonly available forms of monomeric or polymeric elemental sulfur, or other chemicals or chemical compositions which would provide elemental sulfur under the normal conditions of use for compositions of the type described herein. Such sources of elemental sulfur would include, therefore, rhombic, monoclinic and amorphous sulfur. As indicated above, useful compositions may be prepared according to the present invention which may contain about 0.5 to 10 parts by weight of the elemental sulfur per 100 parts by weight of polymer. In order to obtain the most useful compositions which will provide a desired balance of relatively fast cure time for the composition and good physical properties in the cured systems, the preferred amount of sulfur to be used is about 1 to 3 parts by weight. For the same reasons the preferred amounts of lead dioxide and manganese dioxide to be used, per 100 parts by weight of polymer, is about 10 to 13 parts by weight of lead dioxide and about 1 to 2 parts by weight of manganese dioxide.

The bituminous materials which may be used in the compositions of the present invention are preferably of a coal tar derivation and include all of such materials disclosed in U.S. 2,910,922 and 3,238,165. In order to assure a reasonable fast cure of the composition, the bituminous material should have a relatively neutral to basic pH, i.e., about 6 or higher. More acidic materials can be neutralized to achieve the desired pH range.

About 50 to 300 parts by weight of the bituminous materials may be used per 100 parts by weight of polymer. The bituminous materials of a coal tar derivation are the preferred of such materials because relatively high loadings of such materials, i.e., above 50 parts by weight per 100 parts by weight of polymer, can be used in the compositions without leading to the formation of cured compositions which will revert or soften back under prolonged heat exposure. The most preferred of such bituminous materials of a coal tar derivation are those having a viscosity within a range of 20 seconds Saybolt Furol at 77° F. to 150 seconds Saybolt Furol viscosity at 210° F., and more preferably a viscosity range of 200 to 700 seconds Saybolt Furol viscosity at 77° F. as tested by ASTM D–88–44. Materials having a higher viscosity may be thinned out with high boiling plasticizers or solvents, and materials of a lower viscosity may be used where the more volatile nature of such materials would not interfere in the performance of the cured composition.

In addition to the components mentioned above, the compositions of the present invention may also contain various other adjuvants commonly employed in elastomer based sealants without detracting from the usefulness of the compositions for the herein described purposes. Such adjuvant materials should be essentially inert with respect to the components mentioned above.

The compositions may contain, therefore, one or more materials useful as fillers, pigments, and/or reinforcing agents such as carbon black, clays, slate flour, limestone, calcium carbonate, asbestine, aluminum oxide, titanium dioxide, zinc sulfide, silicon dioxide, magnesium silicate, iron oxide and rayon floc. In general the use of these materials tends to decrease the elongation and increase the Shore hardness, toughness and tensile strength of the cured polymer systems. Up to about 200 parts by weight of such materials may be used per 100 parts by weight of polymer.

Plasticizers may also be used in the presently claimed compositions, particularly in combination with the more viscous bituminous materials. Such plasticizers would include chlorinated biphenyls, dibutyl phthalate, dipropylene glycol dibenzoate, di (butoxy-ethoxy-ethyl) adipate, di (butoxy-ethoxy-ethyl)formal, tricresyl phosphate and butyl benzyl phthalate. The plasticizers should preferably be aromatic in nature to insure physical compatability with the bituminous components of the compositions. Up to about 0 to 100 parts by weight of the plasticizers may be used per 100 parts by weight of polymer.

Adhesive additives, such as organo silane compounds, and the phenolic and epoxy resins may also be used in amounts of up to about 10 parts by weight per 100 parts by weight of polymer.

Other additives that may be used, depending on the application, are cure accelerators, ultra violet light stabilizers, thixotropic agents, cure retarders and leveling agents.

The compositions of the present invention may be used commercially in the form of a two-part system. Such two-part systems are those in which the chemically reactive components thereof are stored in separate packages and mixed together to achieve the desired cure reaction just prior to use. This type of system is the most commonly employed in the curable polymer based sealant arts at this time and usually involves the storage, for example, of the curable polymer and curing agent in separate packages until it is desired to use the system. In the case of the present systems, therefore, where it is desired to maintain the components in packaged form for prolonged periods of time it is desirable to place the polymer in one package and the curing agents, $PbO_2$ and $MnO_2$, in another package. The sulfur, furthermore, should not be packaged with the $PbO_2$. For long term storage purposes the novel compositions of the present invention, therefore, may be packaged as a two-part system wherein one part will contain polymer, sulfur and some or all of the bituminous material, and the second part will contain the $PbO_2$, $MnO_2$ and the remainder of the bituminous material. If no bituminous material is used in the second part, a plasticizer may be used to facilitate the eventual dispersion of the $PbO_2$ and $MnO_2$ in the polymer-bituminous material part of the system. The other optional adjuvant materials discussed above can be incorporated in various combinations of proportions in either of the two parts of the system.

The following examples are merely illustrative of the novel compositions of the present invention and are not intended as a limitation upon the scope thereof.

EXAMPLES

A series of two-part formulations were prepared. In each case the Part A component contained bituminous material, curing agents and fillers, and the Part B component contained the polysulfide polymer, sulfur, where sulfur was used, and more bituminous material or plasticizer. The Part A and Part B components of the formulations were then mixed together in an effort to obtain a cure thereof. Suitable tests were conducted on the cured formulations to point out the patentable features of the claimed compositions. The initial cures, in all cases were conducted at room temperature, about 20° C., for 24 hours. After the initial cures certain physical properties of some samples of the cured systems using non-destructive test procedures were noted. The same samples were then heat aged for seven days at 158° F. and then certain physical properties of the aged systems were also observed and evaluated.

The non-destructive testing of the cured and aged samples involved a penetration test and a resilience test. These tests were conducted in accordance with ASTM D–5–52 and an ASTM D–217–52T cone was used for the penetration tests. The penetration test is a measure of the degree of cure of the sample and the tests results are reported in centimeters. Preferred materials are those exhibiting penetration test results of the order of 0.05 to 0.15 centimeters. The cured compositions with the better physical properties exhibit the lower test values in this test procedure. When tested for resilience, cured composition should preferably have a minimum resilience of 90%. The cured compositions with the better resilience properties will exhibit the higher test values in this test procedure.

A third test procedure used to evaluate the cured compositions of the present invention is a destructive type test procedure wherein the test sample is destroyed during the testing procedure. This is called a flow test and is conducted on cured samples in accordance with ASTM D–1853–61T using a 4" x 1½" x ¼" test sample.

A separate set of samples is used in this test procedure. This test procedure involves first curing a sample at room temperature for 24 hours and then heating it for one hour at 212° F. to see whether or not the cured sample will soften or revert back under such test conditions and flow.

The compositions tested and results obtained are shown in the following tables:

TABLE I

| Example | 1 | 2 | 3 |
|---|---|---|---|
| Part A (parts by weight): | | | |
| Bituminous Material I | 81 | 81 | 81 |
| Bituminous Material II | 20 | 20 | 20 |
| Asbestine 325 (magnesium silicate) | 6 | 6 | 6 |
| Sterling MT (Carbon black) | 37 | 37 | 37 |
| $PbO_2$ | 13 | 13 | 13 |
| $MnO_2$ | | 4 | 4 |
| Part B (parts by weight): | | | |
| Polysulfide Polymer I | 50 | 50 | 50 |
| Polysulfide Polymer II | 50 | 50 | 50 |
| Aroclar 1254 (chlorinated biphenyl with 54% Cl) | 66 | 66 | 66 |
| Elemental sulfur | | | 3 |
| Physical properties after curing for one day at room temperature: | | | |
| Penetration (cm.) | 0.16 | 0.45 | 0.07 |
| Resilience (percent) | 80 | 13 | 90 |
| Physical properties after additional heat aging for seven days at 158° F.: | | | |
| Penetration (cm.) | 0.22 | 0.17 | 0.10 |
| Resilience (percent) | 63 | 46 | 98 |

Bituminous I is a high boiling coal tar distillate oil having a Saybolt Universal viscosity of 70 to 140 seconds at 160°F.
Bituminous II is a methyl naphthalene coal tar fraction having a distillation range of 255 to 309° C.
Polysulfide polymer I is a liquid polysulfide polymer having essentially the structure $HS(C_2H_4OCH_2OC_2H_4SS)_{23}C_2H_4OCH_2OC_2H_4SH$ with 4% branching.
Polysulfide Polymer II is a liquid polysulfide polymer having essentially the structure $HS(C_2H_4OCH_2OC_2H_4SS)_{23}C_2H_4OCH_2OC_2H_4SH$ with 1% branching.

The tests conducted in Examples 1 and 2 indicate that polysulfide polymer-bituminous compositions cured with lead dioxide alone, or a combination of lead dioxide and manganese dioxide, are too soft and not resilient enough. The composition tested in Example 3 which was cured with a combination of lead dioxide, manganese dioxide and sulfur, however, had a high degree of resilience and was not too soft initially and did not soften on heating.

TABLE II

| Example | 4 | 5 | 6 |
|---|---|---|---|
| Part A (parts by weight): | | | |
| Bituminous Material I | 110 | 110 | 110 |
| Celite 535 (amorphous diatomaceous earth) | 21 | 21 | 21 |
| SRF black (carbon black) | 14 | 14 | 14 |
| Asbestine 325 | 7 | 7 | 7 |
| $MnO_2$ | 2 | 1 | 15 |
| $PbO_2$ | 13 | 13 | |
| Part B (parts by weight): | | | |
| Polysulfide Polymer I | 75 | 75 | 75 |
| Polysulfide Polymer II | 25 | 25 | 25 |
| 80/20 mixture by weight of Bituminous Material I and Bituminous Material III | 55 | 55 | 55 |
| Elemental sulfur | 1 | 1 | 1 |
| Physical properties after curing for one day at room temperature: | | | |
| Penetration (cm.) | 0.06 | 0.06 | 0.07 |
| Resilience (percent) | 98 | 97 | 95 |
| Physical properties after additional heat aging for seven days at 158° F.: | | | |
| Penetration (cm.) | 0.06 | 0.06 | 0.11 |
| Resilience (percent) | 93 | 95 | 93 |
| Flow, after 1 hour heating at 212° F | (¹) | (¹) | (²) |

¹ No flow.
² Flowed badly.

Bituminous Material III is a coal tar pitch having a Ring and Ball softening point of 102–100° C.
Examples 4 and 5 show that cured compositions formulated according to the present invention have the desired resilience properties and do not soften or revert back upon exposure to prolonged heating. Example 6 demonstrates that although a composition cured with $MnO_2$ and sulfur may have desirable properties initially, that such compositions will soften or revert back under prolonged heating.

TABLE III

| Example | 7 | 8 | 9 | 10 |
|---|---|---|---|---|
| Part A (parts by weight): | | | | |
| Bituminous Material I | 110 | 110 | 110 | 110 |
| Celite 535 | 21 | 21 | 21 | 21 |
| SRF black | 14 | 14 | 14 | 14 |
| Asbestine 325 | 7 | 7 | 7 | 7 |
| $PbO_2$ | 13 | 13 | 13 | 13 |
| $MnO_2$ | 4 | 4 | 4 | 4 |
| Part B (parts by weight): | | | | |
| Polysulfide Polymer I | 75 | 75 | 75 | 75 |
| Polysulfide Polymer II | 25 | 25 | 25 | 25 |
| 80/20 mixture by weight of Bituminous Material I and Bituminous Material III | 55 | 55 | 55 | 55 |
| Elemental sulfur | 3 | 2 | 1 | |
| Physical properties after curing for one day at room temperature: | | | | |
| Penetration (cm.) | 0.05 | 0.06 | 0.05 | 0.05 |
| Resilience (percent) | 96 | 96 | 97 | 96 |
| Physical properties after additional heat aging for seven days at 158° F.: | | | | |
| Penetration (cm.) | 0.08 | 0.08 | 0.07 | 0.16 |
| Resilience (percent) | 93 | 94 | 94 | 79 |

Examples 7 to 10 illustrate the fact that only a small amount of sulfur is needed to prevent softening or reverting back of compositions cured with a combination of $MnO_2$ and $PbO_2$. Even under relatively mild heat aging conditions, the composition of Example 10, which did not contain sulfur, softened or reverted back.

I claim:
1. A curable, polymer based composition comprising, in weight ratio,
    100 parts by weight of at least one polysulfide polymer having a plurality of terminal groups selected from the group consisting of —SH and —SSH,
    about 50 to 300 parts by weight of bituminous material,
    about 0.5 to 10 parts by weight of elemental sulfur,
    about 4 to 20 parts by weight of lead dioxide, and
    about 0.5 to 5 parts by weight of manganese dioxide.
2. A curable composition as in claim 1 in which said polysulfide polymer has —SH terminal groups.
3. A curable composition as in claim 1 in which said bituminous material is of a coal tar derivation.
4. A curable, polymer based composition comprising, in weight ratio,
    100 parts by weight of at least one polysulfide polymer having a plurality of —SH groups,
    about 50 to 300 parts by weight of bituminous material of coal tar derivation,
    about 0.5 to 10 parts by weight of elemental sulfur,
    about 4 to 20 parts by weight of lead dioxide, and
    about 0.5 to 5 parts by weight of manganese dioxide
5. A curable, polymer based composition comprising, in weight ratio,
    100 parts by weight of at least one polysulfide polymer having a plurality of —SH groups,
    about 50 to 300 parts by weight of bituminous material of coal tar derivation,
    about 1 to 3 parts by weight of elemental sulfur,
    about 10 to 13 parts by weight of lead dioxide, and
    about 1 to 2 parts by weight of manganese dioxide.

References Cited

UNITED STATES PATENTS 3,316,194   8/1967   Payne _____ 260—28

MORRIS LIEBMAN, Primary Examiner

P. R. MICHL, Assistant Examiner

U.S. Cl. X.R.
260—79.1